United States Patent [19]
Bozzuto et al.

[11] Patent Number: 5,642,614
[45] Date of Patent: Jul. 1, 1997

[54] GAS TURBINE COMBINED CYCLE SYSTEM

[75] Inventors: Carl Richard Bozzuto, Enfield, Conn.; Joseph David Bianca, Feeding Hills, Mass.; Walter Franklin Siddall, Suffield, Conn.

[73] Assignee: Combustion Engineering, Inc., Windsor, Conn.

[21] Appl. No.: 472,429

[22] Filed: Jun. 7, 1995

Related U.S. Application Data

[62] Division of Ser. No. 175,972, Dec. 30, 1993, Pat. No. 5,467,591.
[51] Int. Cl.[6] .................................. F02C 6/18; F02C 7/00
[52] U.S. Cl. ........................................ 60/39.182; 122/7 R
[58] Field of Search ............................ 60/30.07, 39.182; 122/7 R, 7 B

[56] References Cited

U.S. PATENT DOCUMENTS

| | | | |
|---|---|---|---|
| 2,926,493 | 3/1960 | Poole et al. | 60/39.182 |
| 3,442,324 | 5/1969 | Clay et al. | 122/7 R |
| 3,561,405 | 2/1971 | Tramuta | 122/7 R |

FOREIGN PATENT DOCUMENTS

| | | | |
|---|---|---|---|
| 203287 | 5/1959 | Austria | 60/39.182 |
| 339138 | 11/1992 | Japan . | |

OTHER PUBLICATIONS

Chang, Paul K. Control Flow Separation, MaGraw-Hill, New York, 1976; pp. 6–7.

Primary Examiner—Louis J. Casaregola
Attorney, Agent, or Firm—Chilton, Alix & Van Kirk

[57] ABSTRACT

An improved gas turbine combined cycle system having a diffuser duct between the gas turbine and steam generator. The diffuser duct has boundary layer suction to prevent gas jet separation, thereby reducing pressure loss and improving gas velocity profiles in the duct, while eliminating the need for internal flow controls. The gas turbine combined cycle system can be vertically oriented to reduce the plan area of the system and provide for convenient use of a symmetrical diffuser duct and the use of forced circulation on the water side of the steam generator.

10 Claims, 3 Drawing Sheets

GAS TURBINE COMBINED CYCLE SYSTEM

This is a divisional of application Ser. No. 08/175,972 filed on Dec. 30, 1993 (U.S. Pat. No. 5,467,591).

BACKGROUND OF THE INVENTION

This invention relates generally to gas turbine combined cycle systems, and more particularly to systems having a gas turbine and a heat recovery steam generator.

In the power generation industry, various systems are known in which gas turbines, steam generators and steam turbines are combined for reasons of efficiency. One such system employs a gas turbine in conjunction with a steam generator in which the gas turbine is co-generative, as it not only provides power, but also produces a hot gas which is then used in a heat recovery steam generator.

When hot gases from a gas turbine enter the inlet of a heat recovery steam generator (HRSG), the gases must undergo a 10-fold reduction in velocity due to the differences in the sizes of the gas turbine outlet and the HRSG. This decrease in velocity is accomplished in a diffuser duct. Conventional ducts are asymmetrical, having a horizontally extending, flat wall, and an upwardly angled diverging wall. In typical ducts of this type, the angle of divergence of the upper wall is much more than 15°, i.e. the level which would allow for expansion of the gas without separation and backflow of gas inside the diffuser duct. The reasons for using a diffuser having a degree of divergence greater than 15° are economic, i.e. in order to minimize costs and space requirements. Unfortunately, however, there are problems associated with gas jet separation resulting from the use of a diffuser duct having a higher degree of divergence. First, the divergence results in an increase in overall system pressure loss. Second, gas jet separation results in flow velocity profiles which are less then ideal for both duct burners and pollution control devices employed within the duct.

The conventional solution to the problem of poor flow velocity profiles has been to use flow controls within the diffuser duct. The drawback of such controls is that they are expensive and tend to increase the overall pressure loss within the system.

Conventional gas turbine combined cycle systems of the type described above include a horizontally-oriented gas turbine which sends exhaust gas into a heat recovery steam generator located next to the gas turbine in a horizontal relationship. HRSGs manufactured and used in the United States often rely upon natural circulation on the water side. Forced circulation systems also are known, and are used more commonly in Europe.

SUMMARY OF THE INVENTION

An object of the invention is to provide a gas turbine combined cycle system having a diffuser duct in which backflow of gas in the duct is substantially eliminated.

Another object of the invention is to provide a gas turbine combined cycle system having an improved flow velocity profile.

Another object of the invention is to provide a diffuser duct for a gas turbine combined cycle system in which the need for internal flow controls is eliminated.

Yet another object of the invention is to provide a gas turbine-steam generator combined system which requires a smaller area of plant space and is less expensive.

A further object of the invention is to provide a gas turbine combined cycle system which provides for the convenient use of a symmetrical diffuser arranged vertically between the gas turbine and steam generator.

Another object of the invention is to provide a gas turbine combined cycle system having a reduced pressure drop.

Yet another object of the invention is to provide a gas turbine-steam generator combined system which allows for the use of a shorter stack on the steam generator.

Yet a further object of the invention is to provide a gas turbine combined cycle system having a reduced heat transfer surface.

Other objects will be in part obvious and in part pointed out more in detail hereinafter.

The invention in a preferred form is a gas turbine combined cycle system. The system includes a gas turbine which emits an exhaust gas, a steam generator for receiving the exhaust gas, a diffuser duct between the gas turbine and steam generator for reducing the flow velocity of the exhaust gas prior to entry into the steam generator, and boundary layer suction means for removing gas from along the inner wall surface of a diverging wall of the diffuser duct in order to minimize the overall pressure drop in the diffuser duct. The system of the invention facilitates full expansion of the exhaust gas in the diffuser duct and improves the flow profile of the gas entering the steam generator.

In one particularly preferred form of the invention, the boundary layer suction means is a gas removal line having an inlet end formed in the diverging wall of the diffuser duct and an outlet end connected to the turbine inlet. In another particularly preferred embodiment, the inlet end of the gas removal line is in the wall of the diffuser duct, and the outlet end is connected to the steam generator. In this embodiment, conveying means are included for conveying gas from the inlet end to the outlet end. In a third particularly preferred form of the invention, the boundary layer suction means includes a number of tubes or ducts each having an inlet end formed in the wall of the diffuser duct at a location in which the pressure in the duct is $P_1$ and an outlet end in the diffuser duct at a location in which the pressure in the duct is less than $P_1$, and the gas is circulated through the boundary layer suction means by the venturi effect. The diffuser duct of the invention preferably provides for an inlet/outlet gas velocity ratio of at least about 5–15, and more preferably 9–11. The diffuser duct preferably has at least one wall having and angle of divergence of about 15°–90°, preferably about 30°–60°. The gas experiences substantially no backflow in the diffuser duct of the invention.

Another preferred form of the invention is a gas turbine combined cycle system including a vertically oriented gas turbine which emits an exhaust gas, a vertically oriented steam generator for receiving the exhaust gas, the steam generator being at a higher vertical level than the turbine and having forced circulation on the water side or tube side, and a diffuser duct between the turbine and steam generator for reducing the flow velocity of the exhaust gas prior to entry into the steam generator. In this embodiment, the diffuser duct preferably is of generally symmetrical configuration, and the steam generator emits exhaust directly into a stack.

Yet another preferred form of the invention is a method for reducing separation of a gas jet in a diffuser duct of a gas turbine combined cycle system. The method comprises using boundary layer suction means to remove gas from along the inner wall surface of the diverging portion of the diffuser duct and reinserting the removed gas at an upstream or downstream location.

A further embodiment of the invention is a method of making a gas turbine combined cycle system having a gas turbine, a steam generator and a diffuser duct therebetween. The method includes the steps of orienting the gas turbine, diffuser duct and steam generator vertically with the steam generator at a higher vertical location than the gas turbine, and providing means for circulating a water/steam mixture on the tube side, i.e. the water side, through the steam generator by forced circulation.

The invention accordingly comprises the several steps and the relation of one or more of such steps with respect to each of the others and the article possessing the features, properties, and the relation of elements exemplified in the following detailed disclosure.

DETAILED DESCRIPTION OF THE PREFERRED EMBODIMENTS

Figure 1:
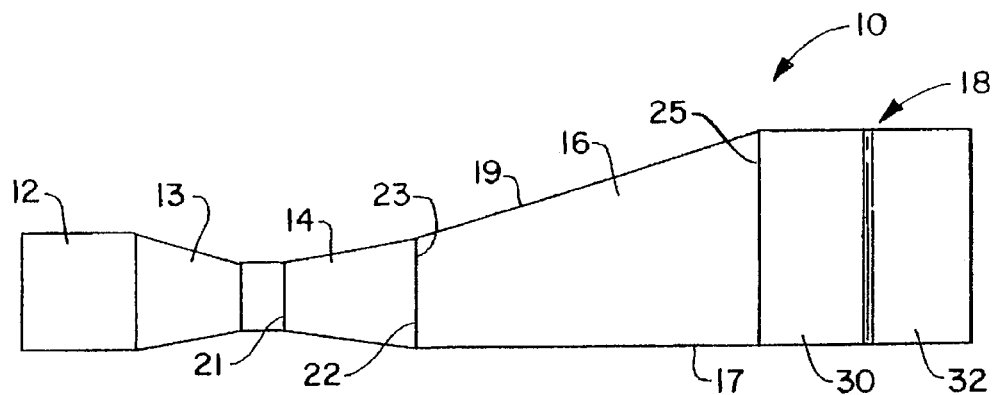
FIG. 1 schematically shows a conventional gas turbine combined cycle system.

Referring to the drawings, and in particular to FIG. 1, a conventional gas turbine-HRSG system is shown and is designated as 10. The system includes a generator 12, a compressor 13, and a gas turbine 14, connected in series. The turbine 14 has an inlet 21 and outlet 22. The exhaust from the gas turbine 14 passes through a diffuser duct 16 and into the inlet of a heat recovery steam generator 18. The HRSG 18 includes a superheater 30, and a boiler bank 32 downstream from the superheater 30. The diffuser duct 16 is required because the turbine outlet 22 is smaller than the entrance to the HRSG. The diffuser duct 16 is asymmetrical, having a horizontal bottom wall 17, an upwardly slanting, diverging upper wall 19, an inlet 23, and an outlet 25. This configuration allows for an appropriate connection between the turbine 14 and HRSG 18 without requiring the turbine to be elevated, as would be necessary if the diffuser duct 16 diverged in a symmetrical manner.

Figure 2:
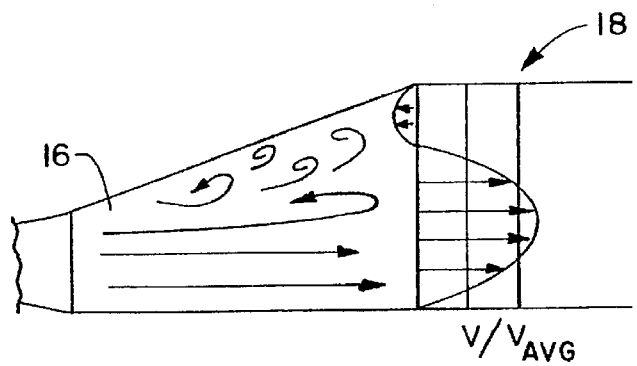
FIG. 2 schematically shows the gas flow pattern in the diffuser duct of a conventional gas turbine combined cycle system in which flow controls are not used.

When the angle of divergence of the diffuser duct relative to a horizontal plane is more than about 15°, and no internal flow controls are employed within the duct, the gas flow through the diffuser duct is likely to have a profile similar to that shown in FIG. 2. As illustrated, gases along the lower portion of the duct 16 proceed into the HRSG 18, while the gas along the upper wall experiences an adverse pressure gradient and flow separation which results in backflow. This flow pattern increases the pressure drop through the system and thereby results in system inefficiencies. This flow profile also results in the inefficient use of the heat transfer surface in the HRSG, as explained below in further detail.

As an alternative to the use of internal flow controls within a diffuser duct which diverges at an angle greater than 15°, the diffuser duct 16' of the invention uses a boundary layer suction system such as is shown in FIGS. 3–6. As illustrated in these Figures, boundary layer gases from the diverging portions of the diffuser duct are removed and re-inserted into the system at an upstream or downstream location. This removal substantially prevents, or at least reduces, the turbulence and backflow which otherwise would occur in diverging portions of the duct.

Figure 3:
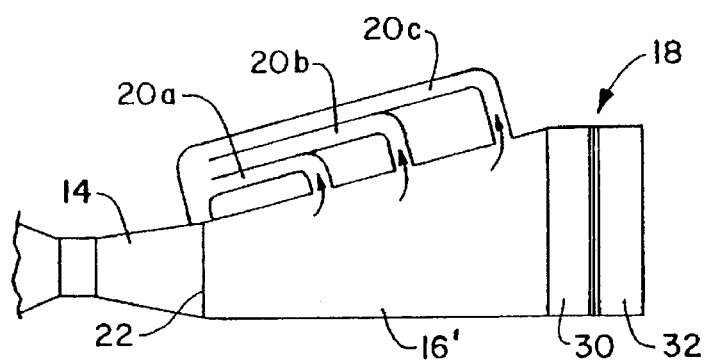
FIG. 3 schematically shows a side view of a diffuser duct for a gas turbine combined cycle system in accordance with the present invention.
Figure 4:
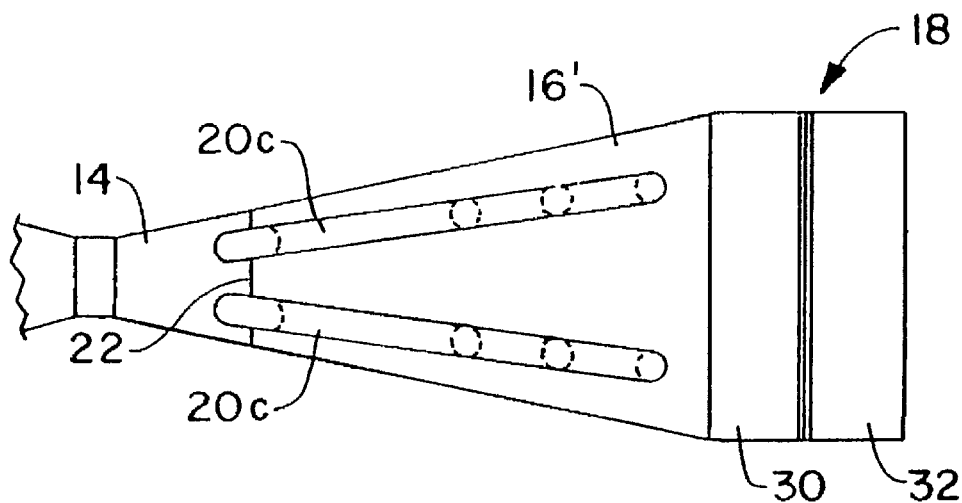
FIG. 4 shows a top view of the duct of FIG. 3.

Boundary layer suction can be effected in a variety of ways. As shown in FIGS. 3 and 4, one technique is to apply the venturi effect, in which gas in a lower velocity section of the diffuser duct, i.e. a section with larger cross-sectional area, is removed and re-inserted in the system at another location having a higher velocity and thus a lower pressure. As shown in FIG. 3, gas is removed through narrow tubes 20a–20c at three equally spaced locations along the length of the diffuser duct 16'. All three of the tubes 20a–20c within a single set, each of which operates in accordance with the venturi effect in this embodiment, have an outlet end connected to the low pressure turbine outlet 22.

In the asymmetrical duct shown in FIGS. 3 and 4, it is only necessary to apply boundary layer suction along the diverging portion of the wall. Any number of tubes 20 can be used. The selection of the number and location of tubes will depend upon the particular system which is in operation, including sizes of the gas turbine and steam generator, angle of divergence of the diffuser duct, and flow rate of the gases through the duct.

Figure 5:
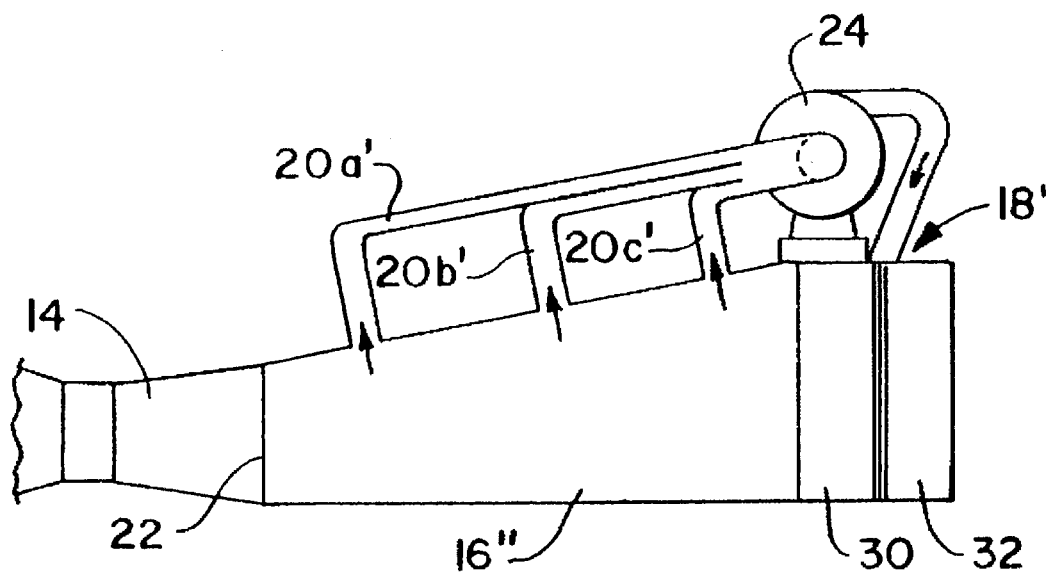
FIG. 5 schematically shows a second embodiment of a diffuser duct in accordance with the present invention.

As shown in FIG. 5, the tubes 20a'–20c' from the duct 16" can instead transfer gas to a downstream location. In this embodiment, suction can be applied along the boundary layer by attaching a suitably mounted fan 24 to tubes 20a'–20c' in order that the suction side draws gas from the diverging portion of the tube, and re-inserts the gas in the HRSG 18' at a convenient location. It is desirable to re-insert the gas at a low-pressure location. A variety of locations normally will be suitable. Selection of a location will depend in part upon heat duty and performance requirements, and an appropriate selection can be made by one having ordinary skill in the art.

Figure 6:
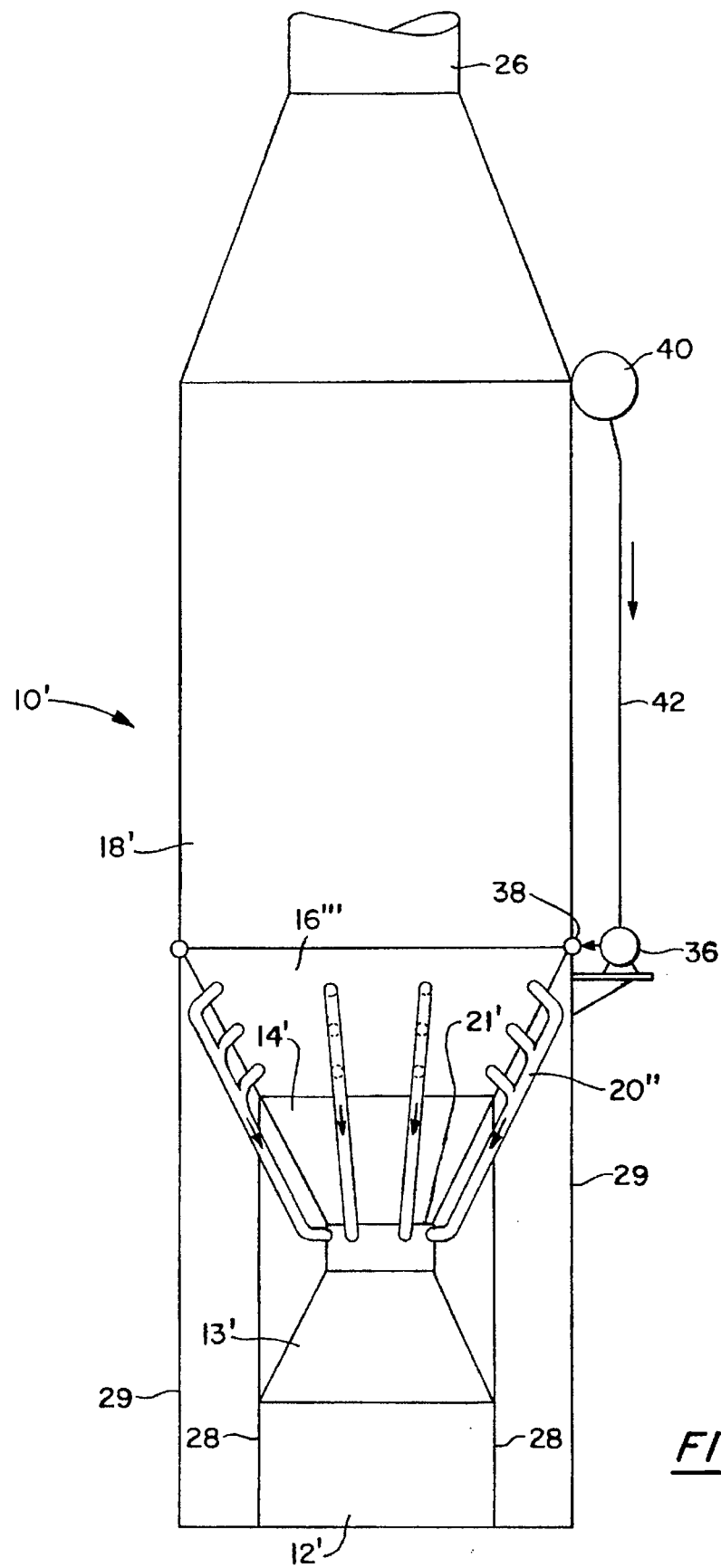
FIG. 6 schematically illustrates a vertically-oriented gas turbine combined cycle system in accordance with the present invention, including a third embodiment of a diffuser duct.

A particularly preferred form of the invention is shown in FIG. 6. In this embodiment, the gas turbine HRSG system is designated as 10', and is oriented vertically. The system includes a generator 12' at the lower end, a compressor 13' above the generator, and a gas turbine 14' connected to the upper and downstream end of the compressor, having a turbine inlet 21. A symmetrical diffuser duct 16'" directs exhaust gas from the turbine 14' into the inlet of an HRSG 18'. As a result of the vertical orientation of the system 10, the HRSG 18' can be conveniently configured to operate on forced circulation.

Forced circulation of the water-steam mixture on the water side of an HRSG, or any steam generator, provides for guaranteed minimum flow of the mixture to all of the boiler tubes in the steam generator. As a result of this improved control, somewhat thinner boiler tubes can be used, because the cooling of the tubes is improved by the internal mass flow. For low pressure steam, the differences tend to be small and thus forced circulation is not needed. However, as steam pressure is increased, forced circulation becomes more desirable. In the forced circulation system which is shown schematically in FIG. 6, a pump 36 is used to force water from a downcomer 42 of a steam drum 40 into a lower header 38 of the boiler bank. The pump pressure is selected such that flow of water is guaranteed to all tubes exiting the lower header 38. As heat is absorbed by the tubes, some of the water is boiled to make steam. The capacity of the pump is selected to assure that a steam-water mixture is always maintained in the boiler tubes.

The steam-water mixture is collected at the top of the boiler in the steam drum 40. The steam drum 40 is designed to separate the steam from the water. The steam is sent to the superheater of the boiler for additional heating. The water is drained by the downcomer 42 from the drum in to the inlet of the pump 36.

Effluent gas from the HRSG is emitted through a stack 26. As a result of the vertical configuration, the stack itself is shorter than conventional stacks on horizontal systems having outlets at the same distance from the ground.

In addition to the ability to conveniently install a forced circulation system in the steam generator, another advantage of the vertical orientation of the system 10' is that it enables the use of the symmetrical diffuser duct 16'". As shown in FIG. 6, the diffuser duct has a plurality of tubes 20" which direct gas from the diffuser duct back to the turbine inlet 21'. The turbine 14' is supported by a turbine support system, schematically shown as 28. The steam generator with the stack mounted thereon, are supported by a heavy steel HRSG support system 29.

The vertical configuration of the system 10' minimizes the plan area of the plant. As a result of the use of a symmetrical diffuser duct, the overall pressure drop in the system can be reduced and the length of the diffuser duct can be decreased. The combination of the improved diffuser and the forced circulation on the water side of the HRSG will result in a reduced heat transfer surface requirement. The improved diffuser results in an improved gas flow profile which, in turn means that the flow over the boiler tubing is more uniform, resulting in a more efficient utilization of the tube surface. The improved efficiency of surface utilization means that fewer square feet of surface can be used to absorb the same amount of heat. As noted above, the forced circulation of the steam-water mixture allows for a higher mass flow of the mixture on the inside of the boiler tube which assures proper cooling in all of the tubes. This results in a slightly smaller tube. The combined result is fewer, smaller, thinner tubes. The overall weight of the system is thus reduced, resulting in a more economical arrangement.

As will be apparent to persons skilled in the art, various modifications and adaptations of the structures above described will become readily apparent without departure from the spirit and scope of the invention, the scope of which is defined in the appended claims.

We claim:

1. A gas turbine combined cycle system, comprising:

a vertically oriented turbine which emits an exhaust gas, a steam generator for receiving the exhaust gas, the steam generator being above the turbine and having a water side which includes forced circulation means, and a vertically oriented diffuser duct between the turbine and the steam generator for reducing the flow velocity of the exhaust gas prior to entry into the steam generator.

2. A system according to claim 1, wherein the diffuser duct has a generally symmetrical configuration.

3. A system according to claim 1, wherein the steam generator emits exhaust gas directly into a stack.

4. A method of making a gas turbine combined cycle system including a gas turbine, a steam generator downstream from the gas turbine, the steam generator having a water side, and a diffuser duct between the gas turbine and steam generator, the method comprising:

orienting the gas turbine, diffuser duct and steam generator vertically, with the steam generator directly above the diffuser duct and the diffuser duct directly above the gas turbine, and providing forced circulation means on the water side of the steam generator.

5. A gas turbine combined cycle system according to claim 3, wherein the diffuser duct has a generally symmetrical configuration.

6. A gas turbine combined cycle system according to claim 3, wherein the diffuser duct has boundary layer suction.

7. A gas turbine combined cycle system according to claim 5, wherein the diffuser duct has boundary layer suction.

8. A method according to claim 4, wherein the diffuser duct has a generally symmetrical configuration.

9. A method according to claim 4, wherein the steam generator emits exhaust gas directly into a stack.

10. A method according to claim 9, further including the step of providing the diffuser duct with boundary layer suction means.

* * * * *